Nov. 26, 1968     O. T. SARBER     3,413,009

CHUCK

Filed Jan. 11, 1966     3 Sheets-Sheet 1

INVENTOR.
OLIVER T. SARBER
BY
ATTORNEY

INVENTOR.
OLIVER T. SARBER
BY
ATTORNEY

United States Patent Office 3,413,009
Patented Nov. 26, 1968

3,413,009
CHUCK
Oliver T. Sarber, Elkhart, Ind.
(4110 NW. 47th Court, Fort Lauderdale, Fla. 33313)
Filed Jan. 11, 1966, Ser. No. 521,484
10 Claims. (Cl. 279—2)

ABSTRACT OF THE DISCLOSURE

A chuck for use on lathes and grinding, screw and boring machines in which a plurality of jaw elements are pivotally connected at their outer edges with the jaw plate, and a member is provided on each of the elements having oppositely facing surfaces. An axially movable sleeve with rollers disposed between the oppositely facing faces and the respective part of the sleeve gives precise engagement of the jaws and permits repeated usage without any significant change occurring in the adjustment thereof.

---

Figure 1:
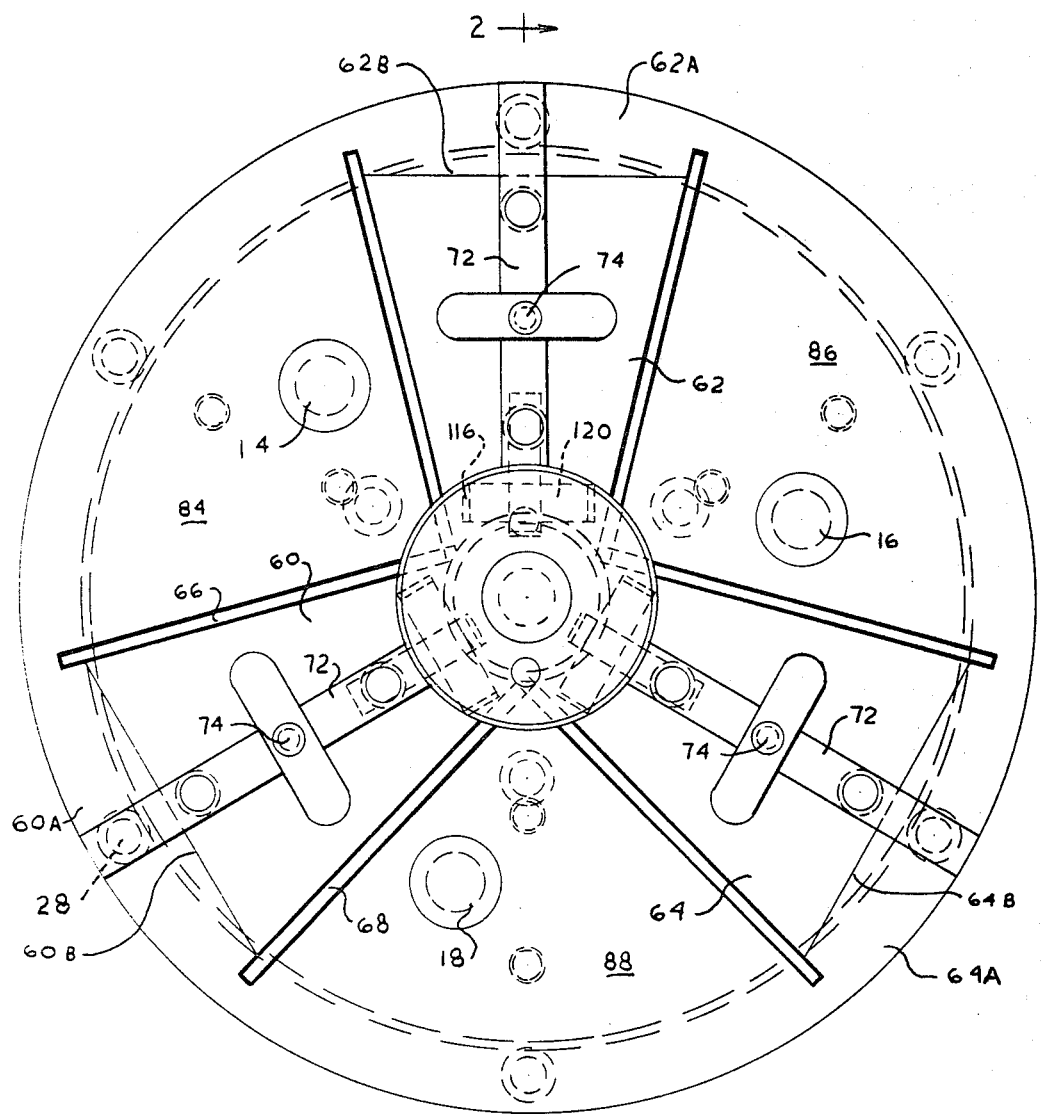

Chucks of the general type involved herein are designed and constructed to give and maintain extreme accuracy in retaining a work piece in proper position for machining and repeating the work piece engaging and disengaging operation an unlimited number of times without varying the setting on the chuck or the chuck otherwise becoming improperly adjusted with respect to the cutting tool. The chuck will normally initially provide the extreme accuracy required; however, with repeated chucking operations, wear occurs in some of the moving parts which results in misalignment of the work piece or insecure engagement of the work piece by the jaws of the chuck. Since the foregoing chuck is designed for extreme accuracy, slight wear between several of the moving parts of the chuck often renders the chuck unsatisfactory for further precise and accurate machining. While minor adjustments can be made in the chuck to compensate for the wear, the inaccuracies resulting from the wear usually cannot be completely eliminated by these adjustments. Further, since the wear between the parts is often small for the amount of unacceptable misalignment or maladjustment of the work piece, difficulty is encountered in repairing and reconditioning the moving parts of the chuck to give the required satisfactory performance. It is therefore one of the principal objects of the present invention to provide a chuck of the foregoing type which is so constructed and arranged that the few moving parts embodied therein are substantially free of wear or other impairments interfering with the proper alignment of the work piece and proper alignment of and engagement of the work piece by the jaws of the chuck, and which can be used repeatedly without any significant change in the moving parts or in the adjustments thereof.

Another object of the present invention is to provide a chuck which, while similar in certain respects to the standard diaphragm in construction and operation, is provided with relatively simple moving operating parts and features of a design and construction especially resistance to wear from repeated chucking and dechucking operations, and which can be embodied in the standard or conventional chucks of the present type without any substantial changes or modifications being made in the basic construction thereof.

Still another object of the present invention is to provide a chuck which can be accurately mounted in an adapter for a lathe, grinder, screw or boring machine and precisely controlled throughout repeated operations to engage and disengage work pieces, and which will perform satisfactorily under adverse operating conditions without the operation becoming impaired by grease, cuttings or other foreign materials.

A further object is to provide a relatively simple, easily operated chuck of the aforesaid type which is relatively simple to fabricate and assemble and which can be used satisfactorily with a variety of different machine tools.

Figure 2:
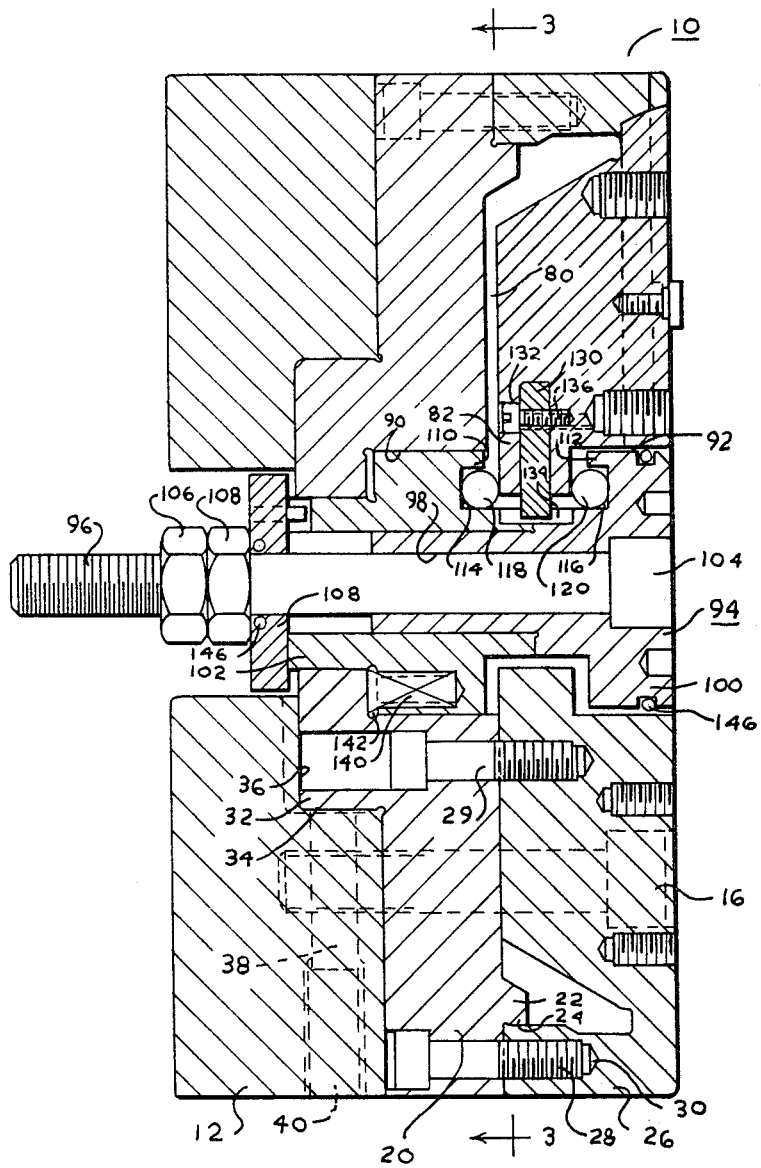
Figure 3:
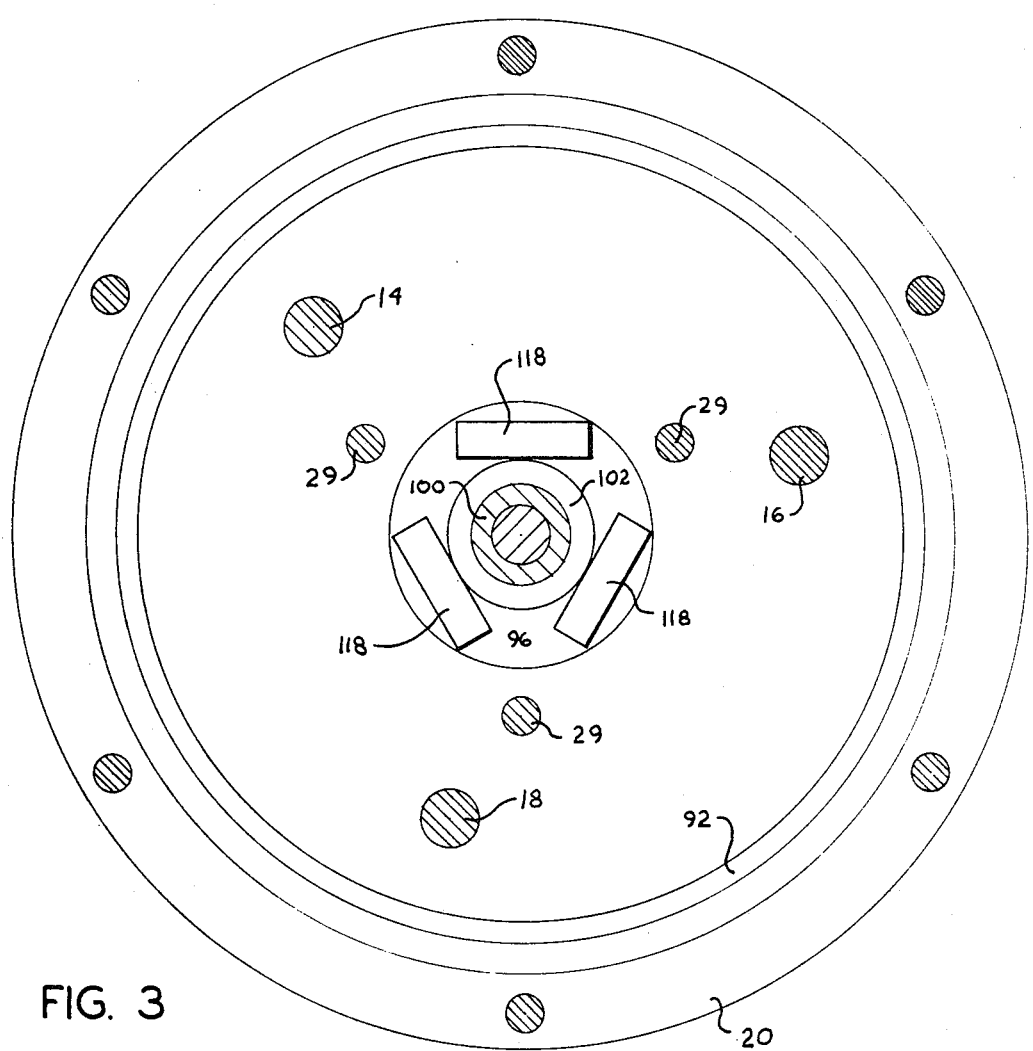

Additional objects and advantages of the present invention will become apparent from the following description and accompanying drawings, wherein:

FIGURE 1 is a front elevational view of a chuck embodying the present invention, the chuck being shown without the standard or conventional jaws normally mounted on the face of the chuck for engaging and holding various work pieces;

FIGURE 2 is a vertical cross sectional view of the present chuck shown in FIGURE 1, the section being taken on line 2—2 of FIGURE 1, with the parts being rearranged to better illustrate the construction thereof, and the chuck being shown mounted in proper operating position on the face plate of a lathe, grinding, screw or boring machine; and FIGURE 3 is a vertical cross sectional view taken on line 3—3 of FIGURE 2.

Referring more specifically to the drawing, numeral 10 designates the present chuck mounted on a face plate adapter 12 of a lathe or other machine tool and secured thereto by a plurality of screws 14, 16 and 18 extending through the chuck into the adapter and being recessed in the face of the chuck. While the present chuck is shown mounted on the face plate adapter of a lathe, it may be used satisfactorily on grinding, screw and boring machines, and may be mounted on any suitable adapter or constructed as an integral part of the machine. The face plate is rotatably mounted on the lathe head stock from which the face plate adapter 12, chuck 10, and the work piece mounted in the chuck are driven in unison, while the cutting tool (not shown) performs the cutting or machining operation on the work piece.

The present chuck consists of a disc-shaped body 20 with an axially extending annular flange 22 joined integrally to the body near the external edge thereof and projecting forwardly to form an outwardly facing shoulder 24 for forming a support for jaw plate or assembly 26 secured to body 20 by six bolts 28 extending through and being recessed in the body and being threadedly received in bores 30 in the jaw plate assembly, as shown in FIGURE 2, and bolts 29 securing the assembly and body together to form a unit. These bolts are evenly spaced around the periphery of the body and jaw plate and rigidly hold the body and plate in firm contact and in axial alignment with one another. Body 20 is provided with an external rearwardly extending boss 32 having an external annular shoulder 34 for seating in an annular recess 36 in adapted 12. The boss, and hence the chuck, are retained in place in the annular recess by a plurality of radially extending set screws 38 threadedly received in bores 40 in adapter 12. When the set screws 38 are seated against annular shoulder 34, the chuck is held rigidly in place in the adapter. The body and jaw plate are also secured to adapter 12 by the three bolts 14, 16 and 18 extending inwardly from and recessed in the assembly, and extending through body 20 and being threadedly received in respective bores in adapter 12.

The jaw plate or assembly 26 is disc-shaped and of the same size as body 20, and contains jaw elements 60, 62 and 64 equally spaced around the plate and integrally attached to the main portion of the plate at the peripheral edges 60A, 62A and 64A, respectively, to form a resilient pivoting relationship with the main portion. Each of the three jaw elements is separated from the main portion by the assembly by relatively wide slots 66 and 68 extending generally in a radial direction substantially throughout the length of the jaw elements, thus permitting the jaw elements to pivot inwardly and outwardly as they clamp or engage a work piece. The angular relationship of the slots defining each jaw element provides a straight pivot or hinge line 60B, 62B and 64B which gives maximum accuracy when the jaw elements are flexed outwardly and inwardly, as will be more fully explained hereinafter. The slots 66 and 68 are preferably filled with a sealing or gasket material which is sufficiently resilient or yieldable to prevent any interference with the movement of the jaw elements relative to the main portion of the assembly. The jaws (not shown) are mounted on the jaw elements and are seated in radial slots 72 of each element and are adapted to be adjusted radially outwardly and inwardly and held in fixed position by screws 74.

Since the three jaw elements are identical in construction and operation, only one will be described in detail herein, and like numerals will be applied to like parts where applicable. Each jaw element is spaced from the face of body 20 as shown at numeral 80 and is provided with an inwardly extending flange which forms an operating member 82 for pivoting the element inwardly and outwardly as an adjustment is made. It is seen from FIGURE 1 that the solid sections 84, 86 and 88 between the jaw elements are held rigidly against the face of body 20 by bolts 14, 16 and 18, respectively, and are hence prevented from any movement while the jaw elements are being adjusted.

Body 20 and jaw plate 26 are provided with axial openings 90 and 92 for receiving sleeve assembly 94 which is adapted to reciprocate in the axial openings as a draw bar 96 in an axial opening 98 in the sleeve assembly is moved axially by hydraulic or pneumatic means connected thereto. The sleeve assembly consists of an outer sleeve section 100 and an inner sleeve section 102 overlapping and held firmly in contact with outer sleeve section 100 by shaft 96 together with head 104 on the outer end of the shaft and nuts 106 and 108 threadedly received on the inner end of the shaft, the two nuts seating against a washer or collar 109 seated against the end of sleeve section 102. The two sleeve sections are provided with generally circumferentially extending annular shoulders 110 and 112 facing one another and having grooves 114 and 116, respectively, therein for receiving rollers 118 and 120 for engaging opposed surfaces of member 82 on the inner edge of the jaw elements. As sleeve assembly 94 is moved outwardly and inwardly in axial openings 90 and 92 of body 20 and jaw plate 26, respectively, rollers 118 and 120 engage the respective adjacent surfaces of member 82 and move the jaw element outwardly and inwardly to accomplish the required adjustment of the jaws attached to the face of the three jaw elements. Each of the three elements is provided with the same groove and roller arrangement in the sleeve assembly 94 and the three jaw elements are moved outwardly and inwardly simultaneously and correspondingly, the rollers providing an elongated line contact with the surface of member 82.

The sleeve is prevented from rotating with respect to the jaw elements by a key 130 seated in a radial slot 132 in member 82 and in the inner portion of the jaw element, and the inner end of the key extends into an axial slot 134 in the external surface of outer sleeve section 100 and prevents rotation of the sleeve with respect to the jaw assembly. The key is held in fixed position in slot 132 by a screw 136 threadedly received in a bore in the inner portion of the jaw element. A plurality of equally spaced coil springs 140 are seated in the inner portion of inner sleeve 102 and react against the sleeve and an annular shoulder 142 of body 20 to create a stabilizing effect to assure seating of rollers 118 and 120 on the respective jaw elements. The sleeve is preferably sealed at its outer ends by suitable gaskets 146 in order to exclude dirt and other foreign material.

It is thus seen that as sleeve assembly 94 is moved outwardly, rollers 118 and 120 contact the adjacent surfaces of member 82 of each of the jaw elements, thereby moving the respective jaw elements outwardly, and, as the sleeve assembly is moved inwardly, roller 120 contacts the adjacent surface of member 82 to move the respective jaw elements inwardly. The sleeve assembly is urged outwardly and inwardly by any suitable power operating means, either by a compressed air or hydraulic cylinder or by any suitable mechanical means. Further, the jaw element may be moved in one direction by a series of springs and in the opposite directions by the applied mechanical force.

In the operation of the present chuck, after it has been mounted on the face of adapter 12, the jaws (not shown) are adjusted radially inwardly and outwardly in the respective slots 72 to the approximate position required to center the work piece. If the jaw assembly is being used as external jaws, the work piece is inserted between the inner edges of the jaws while the sleeve assembly is held to its extreme right position, as viewed in FIGURE 2, thereby holding the jaws outwardly to expand the distance between the inner edges thereof. After the work piece has been inserted between the three jaw elements, the sleeve assembly is moved to the left, thereby causing rollers 120 to engage member 82 of each jaw element and move the jaw elements axially inwardly and the jaws mounted thereon radially inwardly, firmly clamping the work piece in the jaws. When the chuck is used with internal jaws, the work piece is assembled on the outer periphery thereof, while sleeve assembly 94 is held in its extreme left position, as viewed in FIGURE 2, by the force applied to shaft 96. In this position of the sleeve assembly, rollers 120 hold the jaw elements axially inwardly and the internal jaws radially inwardly. After the work piece has been mounted on the jaws as described above, shaft 96 and the sleeve assembly are moved axially to the right, thus causing rollers 118 to engage member 82 of the jaw element, and thereby move the jaw elements axially outwardly and the jaws radially outwardly to clamp the work piece. As previously mentioned herein, one direction of the sleeve assembly and shaft may be accomplished by a spring reaction and the other direction by an applied mechanical force.

It is seen that in the present construction, rollers 118 and 120 engage the respective adjacent faces on member 82 of the respective jaw elements to move the elements inwardly and outwardly and operate effectively as elongated bearing surfaces without producing any indentation or scoring of the surface of member 82. Since the rollers provide a relatively large contact point along the entire edge of the respective surfaces of members 82, neither the rollers nor the surfaces of member 82 wear significantly from repeated operation of the chuck, providing constant contact points throughout the movement of the sleeve assembly. The rollers rotate freely in the respective grooves 114 and 116, and provide new contact surfaces thereon, and thereby greatly prolong the life of the critical contact surfaces between the rollers and the respective surfaces on members 82. Thus, extremely delicate settings can be maintained and repeated without alteration from wear within the chuck over long periods of time. Steel rollers, such as those described herein, are preferred for the contact element; however, a plurality of steel balls aligned side-by-side in grooves 114 and 116 and rotatable therein may be used as an elongated rotating contact means.

While only one embodiment of the present chuck has been described in detail herein, various changes and modifications may be made without departing from the scope of the invention.

I claim:

1. A chuck comprising a jaw plate having an axial bore, an annular section concentric with and spaced from said bore and a plurality of jaw elements pivotally connected at their outer edges with said annular portion and extending inwardly therefrom, a member on each of said elements extending inwardly and having a pair of oppositely facing faces transverse to the axis of said bore, a sleeve in said bore having two spaced opposed portions embracing each of said members and having a pair of oppositely facing faces thereon, grooves in one pair of said faces, and elongated rotating means in said grooves for engaging the other pair of said faces for moving said jaw elements.

2. A chuck as defined in claim 1, in which the elongated contact means are rollers.

3. A chuck as defined in claim 2, in which there are three radially extending, spaced jaw elements extending from said bore to near the periphery of said assembly and being joined integrally to said annular section.

4. A chuck as defined in claim 3, in which the members on said jaw elements extend inwardly therefrom to said bore, and have a key means for engaging said sleeve and preventing relative rotation between the sleeve and jaw elements.

5. A chuck as defined in claim 4, in which the grooves are in the second mentioned pair of faces.

6. A chuck as defined in claim 1, in which the members on said jaw elements extend inwardly therefrom to said bore.

7. A chuck as defined in claim 1, in which the grooves are in the second mentioned pair of faces.

8. A chuck as defined in claim 1, in which said jaw plate is generally disc-shaped and is mounted on and rigidly secured to a body having an axial bore therein for receiving one end of said sleeve.

9. A chuck as defined in claim 8, in which said body includes means for mounting said chuck on a machine adapter.

10. A chuck as defined in claim 1, in which an axially positioned draw bar for connection to a source of power moves said sleeve in said bore to operate said jaw elements.

References Cited

UNITED STATES PATENTS

| 1,839,400 | 1/1932 | Lewis | 279—119 |
| 2,224,639 | 12/1940 | Ward | 279—119 |
| 3,087,737 | 4/1963 | Werth. | |
| 3,226,127 | 12/1965 | Sarber. | |

ROBERT C. RIORDON, *Primary Examiner.*

J. C. PETERS, *Assistant Examiner.*